US010618135B2

(12) United States Patent
Dutta et al.

(10) Patent No.: US 10,618,135 B2
(45) Date of Patent: Apr. 14, 2020

(54) METHOD OF CONTROLLING DISTORTION DURING MATERIAL ADDITIVE APPLICATIONS

(71) Applicant: DM3D TECHNOLOGY, LLC, Auburn Hills, MI (US)

(72) Inventors: Bhaskar Dutta, Troy, MI (US); Mark David Lewan, White Lake, MI (US); Jason David Franceschina, Leonard, MI (US)

(73) Assignee: DM3D TECHNOLOGY, LLC, Auburn Hills, MI (US)

( * ) Notice: Subject to any disclaimer, the term of this patent is extended or adjusted under 35 U.S.C. 154(b) by 723 days.

(21) Appl. No.: 15/074,365

(22) Filed: Mar. 18, 2016

(65) Prior Publication Data

US 2016/0271735 A1    Sep. 22, 2016

Related U.S. Application Data

(60) Provisional application No. 62/135,893, filed on Mar. 20, 2015.

(51) Int. Cl.
| | | |
|---|---|---|
| B23K 31/00 | (2006.01) | |
| B23K 37/00 | (2006.01) | |
| B23K 9/04 | (2006.01) | |
| B23K 15/00 | (2006.01) | |
| B23K 10/02 | (2006.01) | |
| B23K 26/34 | (2014.01) | |

(52) U.S. Cl.
CPC ............ *B23K 31/003* (2013.01); *B23K 9/042* (2013.01); *B23K 10/027* (2013.01); *B23K 15/0086* (2013.01); *B23K 26/34* (2013.01); *B23K 37/003* (2013.01)

(58) Field of Classification Search
CPC .............. B23K 15/0086; B23K 11/105; B23K 26/34–342; B23K 9/042–044; B33Y 10/00
USPC .................................................... 219/176.11
See application file for complete search history.

(56) References Cited

U.S. PATENT DOCUMENTS

| | | | | |
|---|---|---|---|---|
| 8,890,022 B2 * | 11/2014 | Beck ...................... | B23K 26/24 | |
| | | | | 219/121.64 |
| 8,994,592 B2 * | 3/2015 | Scott ..................... | B22F 3/1055 | |
| | | | | 343/700 MS |
| 9,592,660 B2 * | 3/2017 | Reese .................... | B33Y 30/00 | |

(Continued)

*Primary Examiner* — Ibrahime A Abraham
*Assistant Examiner* — Ahmad Abdel-Rahman
(74) *Attorney, Agent, or Firm* — Warner Norcross + Judd LLP

(57) ABSTRACT

A source of heat energy and a source of material for performing a material additive process upon the thin wall member is disclosed. A fixture is located relative to the thin wall element. The source of heat energy used for forming a joining member between the workpiece and the fixture to fixedly secure the fixture to the workpiece preventing the thin wall member from deforming when subject to the source of heat energy. A direct material additive process is upon the thin wall member adding material to the thin wall member to improve physical characteristics of the thin wall member. The joining member is mechanically removed from the workpiece after the work piece cools. A portion of the material is mechanically removed from the thin wall member to achieve desired dimensional characteristics.

16 Claims, 2 Drawing Sheets

(56) References Cited

U.S. PATENT DOCUMENTS

| | | | |
|---|---|---|---|
| 2009/0200359 A1* | 8/2009 | Chen | B23K 20/122 228/112.1 |
| 2011/0159666 A1* | 6/2011 | O'Connor | C23C 14/24 438/478 |
| 2016/0176118 A1* | 6/2016 | Reese | B33Y 50/02 425/89 |

* cited by examiner

METHOD OF CONTROLLING DISTORTION DURING MATERIAL ADDITIVE APPLICATIONS

PRIOR APPLICATION

The present application claims priority to U.S. Provisional Patent Application No. 62/135,893 filed on Mar. 20, 2015, the contents of which are included herein by reference.

TECHNICAL FIELD

The present application relates towards a method of direct material deposition onto a workpiece. More specifically, the present application relates toward a method of performing direct metal deposition upon thin walled sections of the workpiece.

BACKGROUND

Direct material deposition such as, for example, direct metal deposition is gaining broader acceptance as an approved manufacturing method for creating complex three-dimensional structures. Typically, an energy beam known to provide a sufficient amount of heat energy is infused with a powder metal alloy, causing the alloy to become molten at which time the alloy is deposited upon the workpiece. In addition, the energy beam creates a melt pool of molten workpiece substrate material into which the infused powder metal alloy is joined. While this process has proven technically feasible and commercially viable for many applications, its use has been limited due to temperature differential of the workpiece upon creation of a melt pool.

For example, one application for direct material deposition that has not been feasible is material deposition upon a thin wall or thin metal member of a larger workpiece. In this situation, the thin metal is known to warp while cooling during and/or after the deposition process. As such, necessary dimensional accuracy and stability has proven elusive. Therefore, there is a strong need to develop a process of direct material deposition upon thin walled members, and the like, where dimensional stability is maintained both while generating the melt pool and cooling the workpiece after deposition.

SUMMARY

A method of performing material deposition on a thin wall element of a workpiece is disclosed. A source of heat energy and a source of material while performing a material additive process upon the thin wall member of the workpiece is provided. A fixture is located relative to the thin wall element. A source of heat energy is used to form a joining member between the workpiece and the fixture to fixedly secure the fixture to the workpiece. The fixture prevents the thin wall member from deforming when subject to the heat energy and when cooling. A material additive process is performed upon a thin wall member, adding material to the thin wall member to enhance material characteristics of the thin wall member. The joining member is mechanically removed from the workpiece after the workpiece cools. The portion of the material added to the thin wall member is also mechanically removed to achieve a predetermined dimensional configuration.

Fixedly securing the fixture to the workpiece relative to the thin wall member of the workpiece ensures dimensional stability beyond that of merely using a fixture. Therefore, a melt pool can be generated upon the thin wall member and material added from material deposition process providing dimensional and material enhancements to the thin wall member. For example, a more durable material having desirable physical properties can now be deposited upon the thin wall member. The fixture prevents the thin wall member from warping even if the rate of the expansion and contraction of the deposited material differs from that of the substrate definite the substrate and the thin wall member because the joining member prevents differing rates of expansion and contraction resulting from the direct material deposition.

BRIEF DESCRIPTION OF THE DRAWINGS

Other advantages of the present invention will be readily appreciated as the same becomes better understood by reference to the following detail description when considered in connection with the accompanied drawings, wherein.

DETAILED DESCRIPTION

Figure 1:
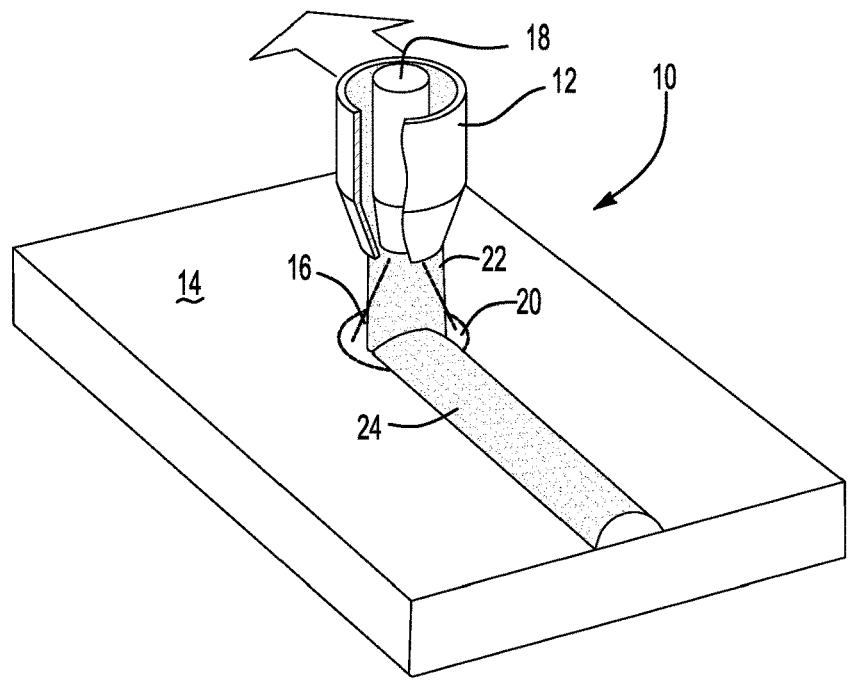
FIG. 1 shows a process of direct material deposition onto a substrate.

Referring to FIG. 1, a direct material deposition onto a substrate is generally shown at 10. A nozzle 12 of the type disclosed in U.S. Pat. No. 6,423,926, the contents of which are incorporated herein by reference, is used for the direct material deposition onto a workpiece 14. The nozzle focuses a laser beam 16 generated by a laser 18 onto the workpiece 14 to generate a melt pool 20. It should be understood that any energy beam that generates heat energy in addition to a laser 16, including but not limited to an electron beam, a gas tungsten arc, a plasma transfer arc, or equivalents is included within the scope of this invention. Therefore, although a laser beam 16 will be referred to throughout this application each of these energy beams is included as alternative embodiments.

The nozzle 12 infuses powdered material 22 into the laser beam 16 toward the melt pool 20. The powdered material 22 includes metal alloys, combinations of different metal alloys, ceramics, and any other material that provides enhanced physical characteristics onto a workpiece 14 at desired locations. Therefore, the powdered material 22 becomes molten at a laser beam 16 upon contact with the melt pool 20, fusing with the substrate defining a workpiece 14 and forming a direct material deposition (DMD) bead 24 upon the workpiece 14. It should be understood by those of ordinary skill in the art that multiple passes of the nozzle 12 over a DMD bead 24 is within the scope of this invention such as, for example, disclosed in U.S. Pat. No. 6,925,346, the contents of which are included herein by reference. However, for clarity, description of multiple passes of the nozzle 12 will not be discussed further herein.

Figure 2:
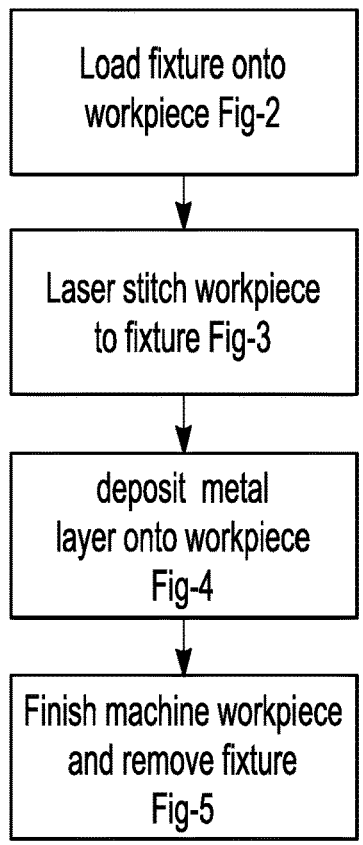
FIG. 2 shows a flowchart of the method of the present invention.
Figure 3:
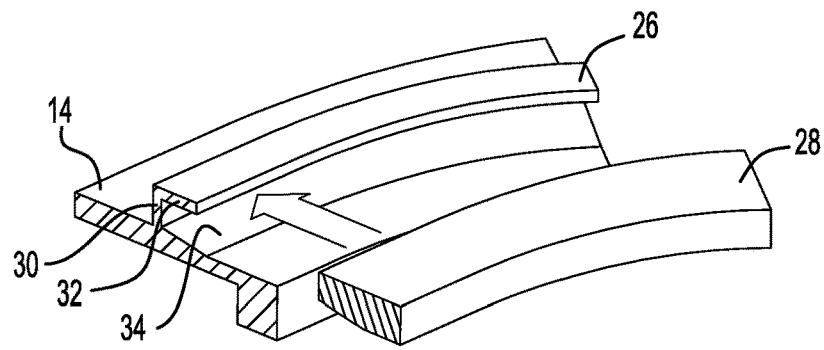
FIG. 3 shows a fixture being located relative to a thin wall member of a workpiece.

Following the flowchart set forth in FIG. 2, and referring now to FIG. 3, the inventive method of the present application will now be discussed further. In this embodiment, the workpiece 14 defines a thin wall member 26, previously performing DMD upon a thin wall member 26 of the workpiece has not been feasible, because generating a melt pool upon a thin wall member 26 in subsequent cooling caused warpage of the thin wall member 26 beyond that which is desirable of a workpiece 24 requiring dimensional accuracy. To prevent warpage, a fixture 28 is located relative to the thin wall member 26.

In this embodiment, the thin wall member 26 includes a first element 30 extending away from the workpiece 14 and a second element 32 extending in a generally lateral direction from the first element 30. The fixture 28 is configured to provide a net or near net engagement between an upper surface 34 of the workpiece 14, the first element 30 and the second element 32. While this configuration is only one example, it should be understood by those of skill in the art that the fixture is designed to provide a net or near net engagement with the thin wall member 26 to prevent the thin wall member 26 from migrating from its design intent as will be explained further herein below.

Figure 4:
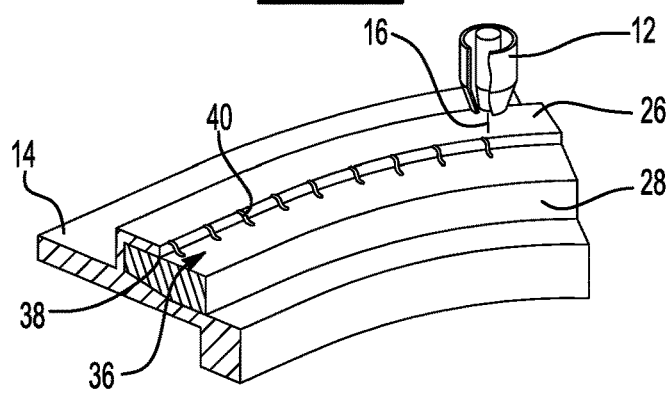
FIG. 4 shows an energy beam applying stitching to a seam of a workpiece and a fixture.

Referring to FIG. 4, a joining member 36 is formed between the workpiece 14 and the fixture 28 by the nozzle 12. In this embodiment, the joining member 36 bridges a seam 38 defined between the thin wall member 26 and the fixture 28 for fixedly securing the fixture 28 to the workpiece 14. The nozzle 12 directs the energy beam 16, in this non-limiting embodiment, a laser, to form a plurality of stitches formed from the powdered material 22. Each stitch 40 bridges the seam 38 defined between the thin wall member 26 and the fixture 28. However, it should be understood by those of ordinary skill in the art that some or all of the stitches 40 may also bridge an alternative seam defined between the workpiece 14 and fixture 28.

Figure 5:
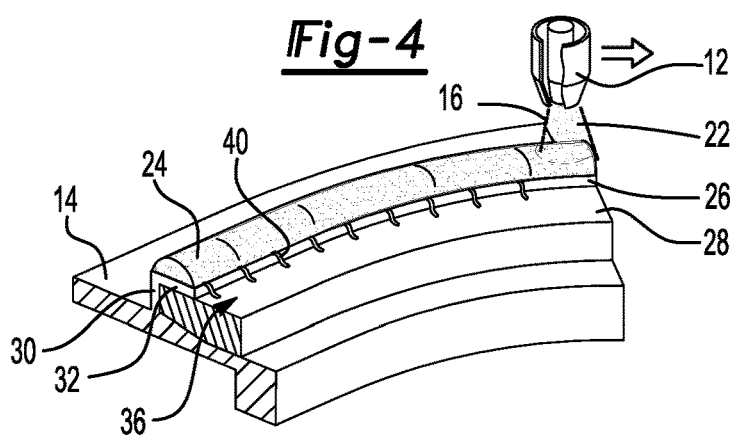
FIG. 5 shows direct material deposition onto the thin wall member of a workpiece.

Once the fixture 28 has been secured to the workpiece 14 in a manner that maintains the net or near net shape of the thin wall member 26, the DMD process is performed upon the thin wall member 26 as represented in FIG. 5. As such, powdered material 22 is directed by the nozzle 12 into the energy beam 16 and melt pool 20 formed on the thin wall member 26. As a result, the DMD bead 24 is formed upon the thin wall member 26, optionally with a build-up of material thickness to substrate thickness ratio of 0.4 to 0.5. It can be appreciated that the DMD process performed upon the thin wall member 26 softens the thin wall member as a result of the formation of a melt pool 20. Therefore, absent the fixture 28, the thin wall member 26 is likely to become deformed from its net or near net disposition. It should be further appreciated that multiple passes of the nozzle 12 providing a plurality of layers of DMD bead 24 is within the scope of this invention, which is likely to cause various temperature gradients to occur between the thin wall member 26 and the plurality of layers of DMD bead 24. This is most likely to occur upon cooling and solidifying of the DMD bead 24.

It is further within the scope of this invention that the material used to "stitch" the fixture 28 to the workpiece 14 be different than that used to deposit the DMD bead 24. For example, the DMD bead 24 may require deposition of expensive or exotic alloys, including ceramics or other non-metallic content not required to achieve desirable performance characteristics. Because the joining member 26 is only temporary, the material used to form the joining member 26 need not be expensive or exotic. The material need only withstand radiant heat generated by the energy beam 16 or dissipating from the melt pool 20 through the thin wall member 26. Thus, a lower cost material is selectable for forming the joining member 26.

It is further contemplated by the inventors that the ratio between spacing of adjacent stitches 40 and length of the DMD bead 24 along the thin wall member 26 is between about 0.003 and 0.006. It is believed that the spacing provides optimal resistance to deformation of the thin wall member 26 during the DMD process and subsequent cooling step.

Figure 6:
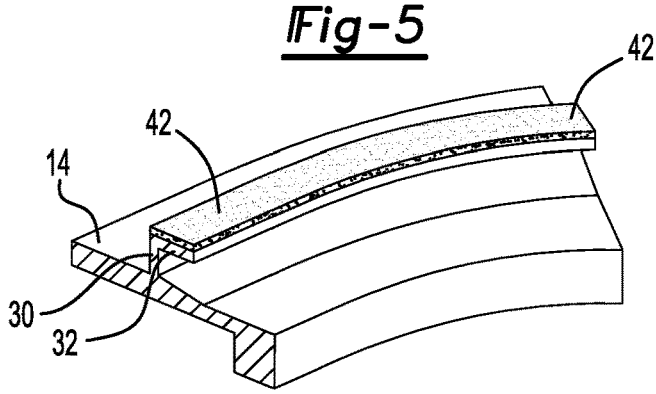
FIG. 6 shows a dimensionally accurate thin wall member of a workpiece reinforced with a layer of direct material deposition.

Once sufficiently cooled, the DMD bead 24 is subject to mechanical reshaping such as, for example, machining to reshape the DMD bead 24 to a support element 42 as best represented in FIG. 6. As set forth above, the support element 42 includes different and beneficial mechanical properties to that of the substrate defining the thin wall member 26. During the machining step, the stitches 40 are mechanically removed simultaneously with forming the support element 42. In the inventive method set forth above, the thin wall member retains its intended dimensional configuration while providing beneficial DMD mechanical properties to enhance the performance of the workpiece 14.

It is further contemplated by the inventors that the fixture 28 provides additional benefits to that of maintaining the thin wall member 26 at its net or near net disposition. For example, the fixture 28 can provide accelerated cooling of the thin wall member 26 and the DMD bead 24 to reduce manufacturing cycle time. This is achievable by either selecting rapid cooling materials to form the fixture 28, or design features that further increase the rate of cooling by the fixture 28 of the thin wall member 26 and DMD bead 24. Alternatively, the fixture 28 can be designed to slow the cooling process of the thin wall member 26 to reduce a possible propensity to warp.

The invention has been described herein in an illustrative manner, and it is to be understood that the terminology which has been used is intended to be in the nature of words of description rather than of limitation. Obviously, many modifications and variations of the invention as possible in light of the above teachings. The invention can be practiced otherwise then as specifically described within the scope of the appended claims period.

What is claimed is:

1. A method of performing material deposition comprising:

providing a wall member of a workpiece, at least a portion of the wall member extending outward and being unsupported from below;

providing a source of heat energy and a source of material for performing a material additive process upon the wall member of the workpiece;

providing a fixture and locating the fixture below the wall member such that wall member is supported by the fixture;

using the source of heat energy for forming a joining member between the workpiece and the fixture by forming a plurality of stitches bridging a seam defined between the wall member of the workpiece and the fixture, thereby fixedly securing the fixture to the workpiece, with the fixture preventing the wall member from deforming when subject to the source of heat energy;

performing a material additive process upon the portion of the wall member supported by the fixture by adding material at a ratio of between 0.4 and 0.5 of added material thickness to wall member thickness, thereby adding material to the wall member;

mechanically removing the joining member from the workpiece; and mechanically removing only a portion of the material from the wall member, such that the wall member includes a layer of the material bonded thereto.

2. The method set forth in claim 1, wherein said step of providing a source of heat energy is further defined by providing one of a laser, an electron beam, gas tungsten arc, plasma transfer arc, or an equivalent.

3. The method set forth in claim 1, wherein said step of forming a plurality of stitches is further defined by forming the plurality of stitches between a seam defined between the fixture and the wall member of the workpiece.

4. The method set forth in claim 1, wherein said step of forming a joining member between the workpiece and the fixture is further defined by forming a plurality of equally spaced stitches bridging a seam defined between the workpiece and the fixture.

5. The method set forth in claim 1, further including the step of cooling the workpiece prior to mechanically removing the joining member and the portion of the material from the wall member.

6. The method set forth in claim 1, wherein said step of forming a plurality of stitches bridging a seam defined between the workpiece and the fixture is further defined by a ratio of between 0.003 and 0.006 of spacing between adjacent stitches and length of material added to the thin wall member by the material additive process.

7. The method set forth in claim 1, wherein said step of providing a fixture is further defined by providing a fixture having a cooling element for accelerating cooling of the wall member.

8. The method set forth in claim 1, wherein said step of adding material to the wall member is further defined by adding material having different chemical and physical properties than the wall member.

9. The method set forth in claim 1, wherein said step of forming a joining member between the workpiece and the fixture is further defined by depositing a same material as the walled member and the material added to the wall member or a different material as the wall member and the material added to the wall member for providing desirable chemical and physical properties relative to the wall member.

10. A method of performing material deposition comprising:

providing a wall member of a workpiece, at least a portion of the wall member extending outward and being unsupported from below;

providing a source of heat energy and a source of material for performing a material additive process upon the wall member of the workpiece;

providing a fixture and locating the fixture below the wall member such that the wall member is supported by the fixture, with said fixture defining a seam with the wall member;

infusing a heating beam generated by the source of heat energy with material received from the source of material;

forming a plurality of stitches along the seam defined between the wall member and the fixture spaced to prevent the wall member from separating from the fixture when the wall member cools after receiving a direct material process from the source of heat energy and the source of material, wherein said step of forming a plurality of stitches is further defined by a ratio of between 0.003 and 0.006 of spacing between adjacent stitches and length of material added to the wall member by the material additive process; and mechanically removing the stitches to separate the workpiece from the fixture.

11. The method set forth in claim 10, further including a step of performing a material additive process upon the wall member by adding material at a ratio of between 0.4 and 0.5 of added material thickness to wall member thickness.

12. The method set forth in claim 10, wherein the fixture defines a net dimensional engagement with the wall member.

13. The method set forth in claim 10, wherein the fixture defines a near net dimensional engagement with the wall member.

14. The method set forth in claim 10, wherein said step of providing a fixture is further defined by providing a fixture having a cooling element for accelerating cooling of the wall member.

15. The method set forth in claim 10, further including a step of cooling the workpiece prior to mechanically removing the joining member and the portion of the material from the wall member.

16. The method set forth in claim 10, wherein said step of forming a plurality of stitches along the seam defined between the wall member and the fixture is further defined by the stitches having a different composition than a composition of a bead of material deposited for increasing thickness of the wall member.

\* \* \* \* \*